March 15, 1949.  H. V. DOREY ET AL  2,464,493
CAPSTAN
Filed Feb. 8, 1945  2 Sheets-Sheet 1
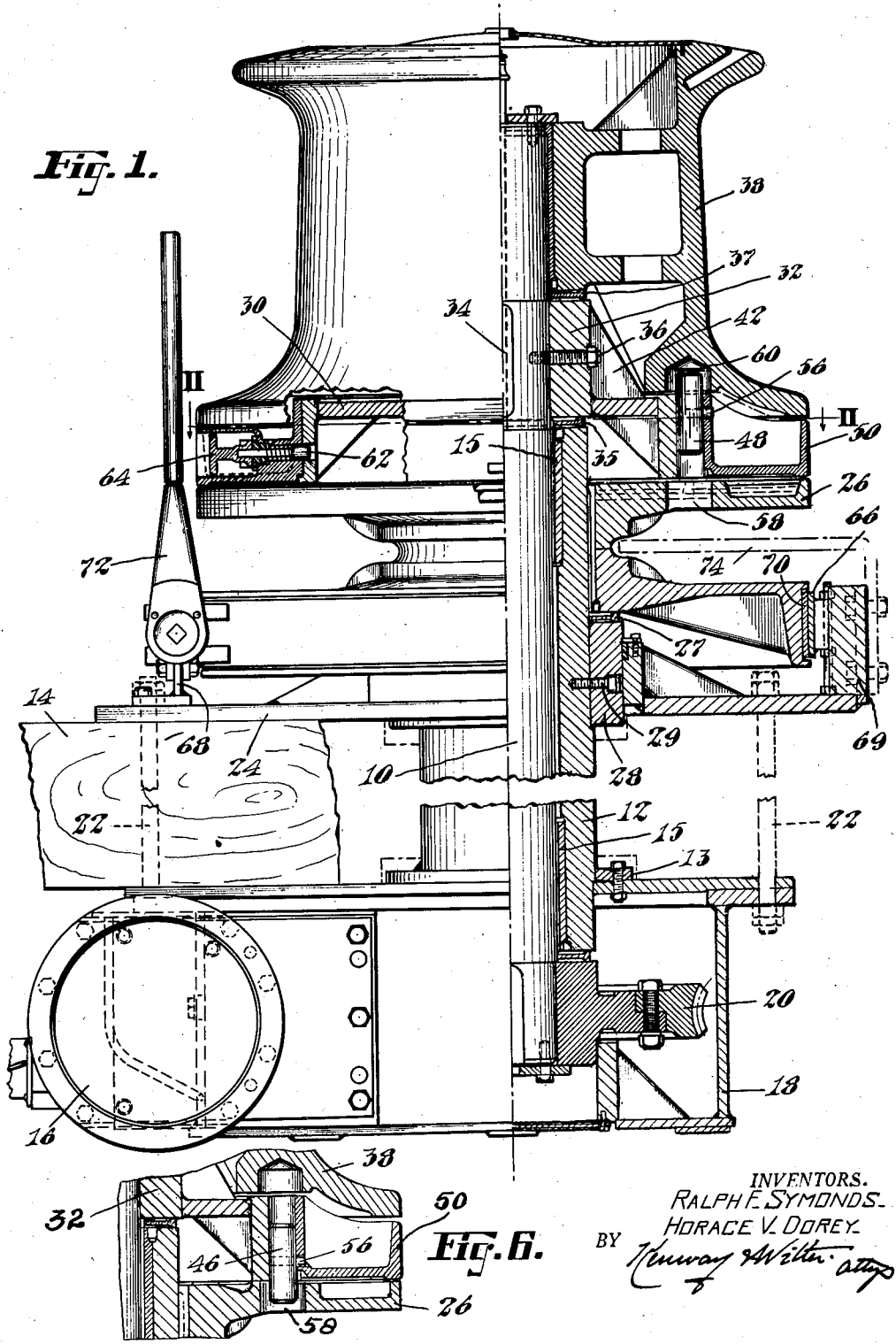
INVENTORS.
RALPH F. SYMONDS
HORACE V. DOREY
BY March 15, 1949. H. V. DOREY ET AL 2,464,493
CAPSTAN
Filed Feb. 8, 1945 2 Sheets-Sheet 2
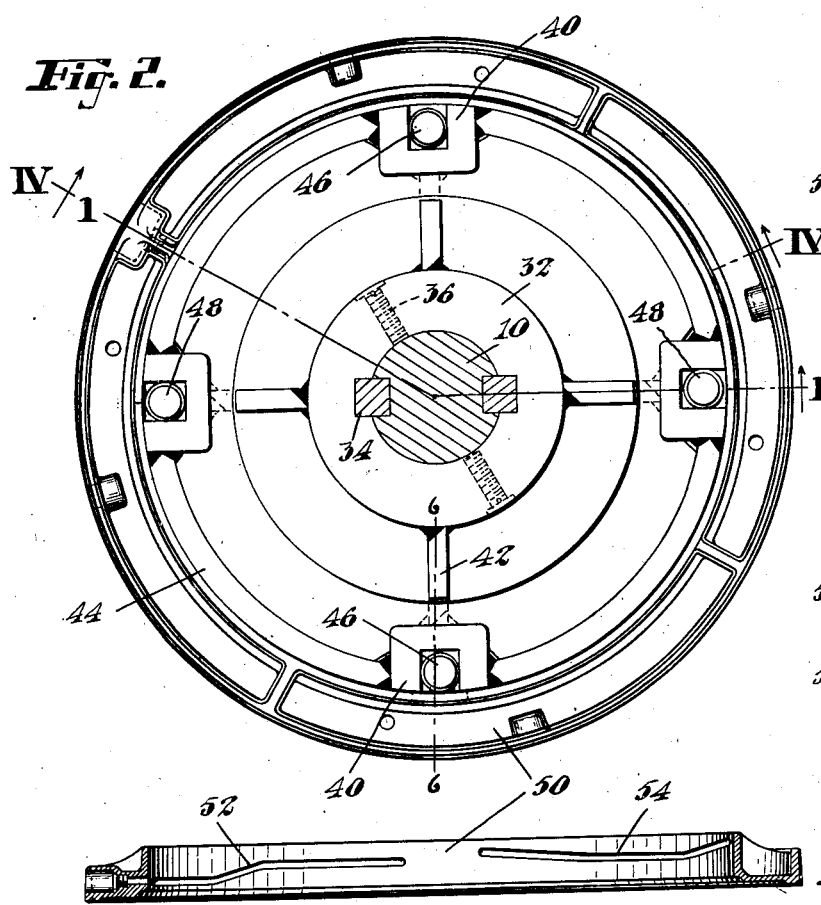
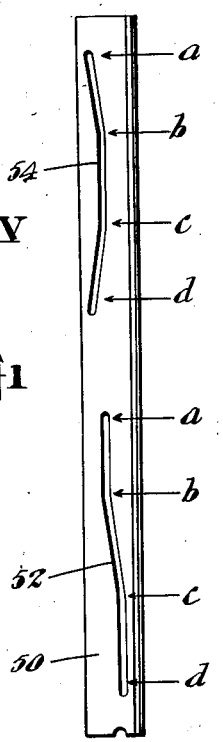
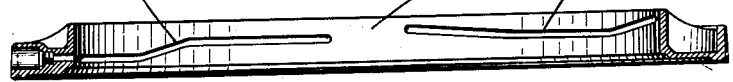
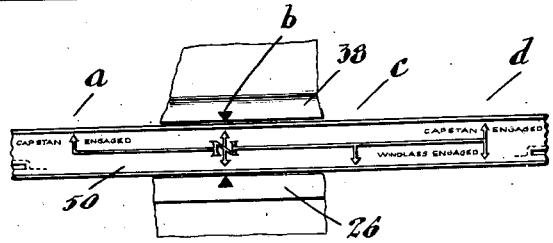
INVENTORS.
RALPH F. SYMONDS
HORACE V. DOREY
BY Patented Mar. 15, 1949

2,464,493

UNITED STATES PATENT OFFICE 2,464,493

CAPSTAN

Horace V. Dorey, Cambridge, and Ralph F. Symonds, Marblehead, Mass., assignors to New England Trawler Equipment Co., Chelsea, Mass., a corporation of Massachusetts Application February 8, 1945, Serial No. 576,744

12 Claims. (Cl. 254—150)

This invention relates to capstans for use particularly on ships and more especially concerns an improved power operated capstan embodying both a capstan head and a windlass drum or wildcat together with means for optionally driving either the head or the drum or driving both of them simultaneously.

The novel construction of our invention includes a vertically extending shaft suitably mounted in bearings and extending above and below the deck of a ship and power operated means below deck for driving the shaft. A capstan head and a windlass drum are mounted to turn freely on the shaft above the deck and conveniently operated mechanism is provided for clutching either or both of them to the driven shaft. Going more into detail, clutch mechanism is provided including a spider fixed to the shaft compactly between the head and drum and carrying clutch dogs, together with a rotary ring thereon for shifting the dogs into predetermined clutching position as the ring is rotated. The apparatus furthermore embodies a friction brake operative on one element of the assembly and adapted to secure both the capstan head and drum from rotation when they are clutched together. The primary object of the invention resides in the production of an improved capstan of this nature and embodying the novel features herein described.

These and other features of the invention will be best understood and appreciated from the following description of a preferred embodiment thereof selected for purposes of illustration and shown in the accompanying drawings wherein:

Fig. 1 is a view in elevation, partially in vertical section on line I—I of Fig. 2, of a capstan embodying the invention, Fig. 2 is a plan view and section taken on line II—II of Fig. 1, Fig. 3 is a development of a portion of the inner periphery of the clutch ring, Fig. 4 is a sectional view through the clutch ring taken on line IV—IV of Fig. 2.

Fig. 5 is a development of a portion of the outer periphery of the clutch ring, and Fig. 6 is a fragmentary sectional view on line VI—VI of Fig. 2 showing the clutching engagement to the windlass drum.

In the drawing the corners shown in solid black conventionally indicate welded joints.

The embodiment of our invention illustrated in the drawings comprises a vertical shaft 10 mounted in bearings provided by a hollow post 12 shown as extending vertically through the deck of a ship. The post 12 supplies a bearing of considerable length and extends above the deck to give substantial lateral support to the shaft. A supporting ring or flange 13 is welded to the post and bolted to the top plate of a gear housing located below the deck and constituting a rigid part of the assembly. The shaft 10 is supported for rotation in bushings 15 located within the post 12 near its opposite ends and is adapted to be rotated from a motor 16 located within a housing 18 below the deck and having a worm (not shown) in driving engagement with a worm wheel 20 fixed to the bottom end of the driven shaft. The housing is secured by bolts 22 passing upwardly through the deck and engaging a deck plate 24.

A windlass drum or wildcat 26 is mounted for free rotation on the post 12 above the deck plate 24, the drum resting on a thrust washer 27 in turn supported on a collar 28 fixed to the bearing post by cap screws 29. A spider 30 is mounted for rotation on the post 12 directly above the wildcat and has an inner hub or collar portion 32 fixed to the shaft by keys 34 and set screws 36, the collar 32 being rotatably supported on a thrust washer 35 resting on the top end of the bearing post 12. A capstan head 38 is mounted for free rotation on the top end of the shaft and is rotatably supported on a thrust washer 37 resting on the top end of the hub or collar 32.

The spider 30 includes four clutch pin supporting heads 40 spaced 90° apart at its periphery and each open at its outer face, the heads 40 being integrally connected to the hub 32 by radial elements 42 and to each other by arcuately extending elements 44, all as shown in Fig. 2. Clutch pins or dogs 46 for cooperating with the windlass drum 26 are slidably mounted in two of the heads and clutch pins or dogs 48 for cooperating with the capstan 38 are slidably mounted in the other two heads. A dog shifting ring 50 is mounted for rotation on and about the spider and is provided with two cam slots 52 therein cooperating with the dogs 46 and two cam slots 54 cooperating with the dogs 48. A pin 56 carried by each of the dogs extends into the adjacent cam slot. Bores or recesses 58 are provided in the wildcat 26 for receiving the dogs 46 and like bores 60 are provided in the base of the capstan for receiving the dogs 48.

The relative contours of the cam paths 52 and 54 are illustrated in Figs. 3 and 4 and, as indicated in Fig. 5, the ring is indexed to show its respective clutch positions. The cam paths are both made up of inclined operating sections and horizontal holding sections. It will be apparent that when the ring is rotated to locate the pins in position *a* (Fig. 3) the spider is clutched to the capstan head 38 through the lifting of the dogs 48. When the ring is rotated to position *b* all dogs are withdrawn to the neutral position. In position *c* the spider is clutched to the wildcat 26 and in position *d* both the capstan head 38 and wildcat 26 are clutched to the spider. A spring pressed detent 62 with an operating handle 64 is provided for locking the ring in any one of these four positions.

It is desirable that means shall be provided for retarding or holding one or both of the freely rotatable members 26 and 38 from rotation and a friction brake 66 is provided for this purpose. As illustrated, this brake is carried on blocks 68 and 69 fixed to the deck plate 24 and is operative against a drum surface 70 on the lower flange of the wildcat 26. Cam mechanism of conventional design operated by a hand lever 72 against the two ends of the brake is adapted to tighten the brake onto the drum. It will be apparent that both the capstan head 38 and the wildcat 26 are under control of the brake when the clutch ring is in position *d*. A chain stripper 74 for the wildcat can be mounted on the block 69 as indicated at 74.

It will be apparent from the foregoing description that before the locking dogs 46 and 48 can be shifted from the spider 30 into engagement with either the capstan or the wildcat 26, the sockets of the capstan and the wildcat must be brought into alignment with the dogs in the spider. To this end an index mark is provided on the lower circumferential edge of the capstan and on the upper circumferential edge of the wildcat as shown in Fig. 5. When these are both turned to register with the neutral index on the ring 50, the necessary relationship of the parts is established; the bores 58 in the wildcat are located below the locking dogs, and the bores 60 in the capstan are located in alignment with and above them. This preliminary setting of the apparatus may be effected by hand by turning the freely rotatable capstan or wildcat with respect to the spider and the ring 50 which itself is held stationary by being locked to the spider by means of the spring detent 62.

It will be understood that the hand lever 72 is arranged for readily detachable connection with its square end brake shaft so that it may be removed and will not interfere in operation with any lead of cable to the capstan.

While we have illustrated our invention as embodied in a capstan, it will be apparent that it may be advantageously applied to a winch or to any hoisting or towing apparatus employing two drums rotating on either horizontal or vertical axis.

Having thus disclosed our invention and described in detail a preferred embodiment thereof, we claim as new and desire to secure by Letters Patent:

1. A capstan comprising a vertical shaft, power means for rotating the shaft, a capstan head freely rotatable on the shaft, a windlass drum or wildcat freely rotatable about the axis of the shaft, and means including a single spider carrying dogs movable upwardly and also other dogs movable downwardly for clutching the shaft optionally to either the capstan head or the windlass drum.

2. The capstan defined in claim 1 in which said means is adjustable to a position clutching both the head and drum to the shaft simultaneously.

3. The capstan defined in claim 1 in which said means is adjustable to a position clutching both the head and drum to the shaft simultaneously and to a neutral position in which the shaft is free from clutching engagement with both the head and drum.

4. A capstan comprising a vertical shaft, power means for rotating the shaft, a capstan head freely rotatable on the shaft, a windlass drum freely rotatable on the shaft, a ring rotatable on the shaft between the head and drum, and means cooperating with the ring for clutching the shaft to the head and drum by rotatably adjusting the ring.

5. A capstan comprising a vertical shaft, power means for rotating the shaft, a capstan head freely rotatable on the shaft, a windlass drum freely rotatable about the axis of the shaft, an annular driver fixed to the shaft between the head and drum, clutching elements carried by the driver and movable respectively in opposite directions into clutching engagement with the head and drum, and a single rotary member surrounding the shaft and operatively connected to the clutching elements for shifting them to and from clutching engagement with either capstan head or drum optionally when the member is rotated.

6. The capstan defined in claim 5 in which said means clutches the shaft to the head when the member is in one position, clutches the shaft to the drum when the member is in another position, and clutches head and drum simultaneously to the shaft when the member is in a third position.

7. A capstan comprising a vertical shaft, power means for rotating the shaft, a capstan head freely rotatable on the shaft, a windless drum freely rotatable on the shaft, an annular driver fixed to the shaft between the head and drum, means including a plurality of pins mounted for longitudinal sliding movement in the driver in a direction parallel with the shaft for clutching the shaft to the head and drum, and a ring rotatably mounted on the driver and having cam paths operatively engaging with the pins for moving them longitudinally to and from clutching engagement with the head and drum when the ring is rotated.

8. The capstan defined in claim 7 in which certain of said pins are mounted for clutching engagement with the head and other of the pins are mounted for clutching engagement with the drum, said ring having independent cam paths cooperating with the different pins and adapted in two positions of the ring to clutch either the head or drum optionally to the shaft and in a third position to clutch both the head and the drum simultaneously to the shaft.

9. The capstan defined in claim 7 in which certain of said pins are mounted for clutching engagement with the head and other of the pins are mounted for clutching engagement with the drum, said ring having independent cam paths cooperating with the different pins and adapted in two positions of the ring to clutch either the head or drum optionally to the shaft and in third and fourth positions to clutch both the head and the drum simultaneously to the shaft or simultaneously to disengage both the head and drum therefrom optionally.

10. Hoisting apparatus including in its structure a driving shaft, two drum members and a locking ring concentrically arranged thereon between the two drum members, and locking elements movable respectively in opposite directions and actuated by said ring for positively connecting both of said drum members or a selected drum member to the driving shaft.

11. Hoisting apparatus including in its structure a driving shaft, two drum members concentrically arranged thereon for free rotation, a single locking ring rotatable about the axis of the shaft and having cam surfaces therein, and separate locking elements actuated by said cam surfaces and in accordance with the amplitude of movement of the ring for optionally locking one or simultaneously locking both of said drum members to the driving shaft.

12. Marine hoisting apparatus comprising a vertical driven shaft, a capstan freely rotatable upon the upper end of the shaft, a spider fast to the shaft beneath said capstan, a windlass drum rotatable about the axis of said shaft beneath said spider, locking dogs carried by the spider, some being mounted to move upwardly into engagement with the capstan and others being mounted to move downwardly into engagement with the windlass drum, and a controlling ring rotatable upon the spider and having independent cam connection with each of the said locking dogs, each connection including an inclined operating section and a horizontal holding section.

HORACE V. DOREY.
RALPH F. SYMONDS.

REFERENCES CITED

The following references are of record in the file of this patent:

UNITED STATES PATENTS

| Number | Name | Date |
|---|---|---|
| 155,877 | Manton et al. | Oct. 13, 1874 |
| 350,464 | Manton | Oct. 5, 1886 |
| 572,781 | Whitney | Dec. 8, 1896 |
| 1,752,962 | Otwell | Apr. 1, 1930 |
| 1,792,093 | Holmes | Feb. 10, 1931 |
| 1,929,641 | Koons | Oct. 10, 1933 |
| 2,165,895 | Joy | July 11, 1939 |

FOREIGN PATENTS

| Number | Country | Date |
|---|---|---|
| 28,643 | Great Britain | Dec. 11, 1913 |